United States Patent
Chang et al.

(10) Patent No.: US 6,507,273 B1
(45) Date of Patent: Jan. 14, 2003

(54) NETWORK-BASED REMOTELY-CONTROLLED POWER SWITCH DEVICE

(75) Inventors: Herlin Chang, Taipei (TW); Ching Piao Lee, Taipei (TW)

(73) Assignee: Digipower Manufacturing Inc., Taipai ( * ) Notice: Subject to any disclaimer, the term of this patent is extended or adjusted under 35 U.S.C. 154(b) by 0 days.

(21) Appl. No.: 09/415,678

(22) Filed: Oct. 8, 1999

(51) Int. Cl.[7] ............................................... G05B 23/02
(52) U.S. Cl. ............. 340/3.1; 340/825.22; 340/286.02; 340/310.01; 712/29; 712/36
(58) Field of Search ............................ 340/825.22, 3.5, 340/3.1, 286.01–286.02, 310.01; 712/36, 29

(56) References Cited

U.S. PATENT DOCUMENTS

| | | | | |
|---|---|---|---|---|
| 4,686,380 A | * | 8/1987 | Angott | 307/113 |
| 5,031,082 A | * | 7/1991 | Bierend | 340/310.02 |
| 5,430,430 A | * | 7/1995 | Gilbert | 340/310.01 |
| 5,471,190 A | * | 11/1995 | Zimmermann | 340/310.01 |
| 5,530,896 A | * | 6/1996 | Gilbert | 340/3.71 |
| 5,565,855 A | * | 10/1996 | Knibbe | 340/3.44 |
| 5,815,652 A | * | 9/1998 | Ote et al. | 709/224 |
| 6,005,476 A | * | 12/1999 | Valiulis | 340/310.01 |
| 6,121,593 A | * | 9/2000 | Mansbery et al. | 219/495 |
| 6,211,782 B1 | * | 4/2001 | Sandelman et al. | 340/3.1 |
| 6,229,433 B1 | * | 5/2001 | Rye et al. | 340/3.5 |
| 6,275,922 B1 | * | 8/2001 | Bertsch | 340/310.06 |

* cited by examiner

Primary Examiner—Nina Tong
(74) Attorney, Agent, or Firm—Curtis L. Harrington

(57) ABSTRACT

A networked-based remotely-controlled power switch device is proposed, which can be coupled to an electricity-powered system, such as a personal computer (PC), a TV, or a video recorder, to allow the electricity-powered system to be powered ON or OFF through remote control by a remote computer system via a network system, such as Internet, Ethernet, or PSTN (Public Switched Telephone Network). This power switch device allows a user without an Internet account to be nevertheless able to use a remote PC system for remote ON/OFF control of the electricity-powered system. Further, in addition to instant ON/OFF control, this power device also allows the user to perform scheduled ON/OFF control to the electricity-powered system so that the electricity-powered system can be automatically powered ON or OFF at a specified time.

5 Claims, 2 Drawing Sheets

NETWORK-BASED REMOTELY-CONTROLLED POWER SWITCH DEVICE

BACKGROUND OF THE INVENTION

1. Field of the Invention

This invention relates to network-based remote control technology, and more particularly, to a network-based remotely-controlled power switch device which can be coupled to an electricity-powered system, such as a personal computer (PC), a TV, or a video recorder, to allow the electricity-powered system to be powered ON or OFF through remote control by a remote computer system via a network system, such as Internet, Ethernet, or PSTN (Public Switched Telephone Network).

2. Description of Related Art

The Internet is a widely used computer network system which allows users to browse Web sites, gain access to worldwide databases, chat with leach other, and send E-mails, to name a few. In addition, the Internet can be used as a medium for remote control of the ON/OFF of an electricity-powered system, such as a PC, a TV, or a video recorder.

SUMMARY OF INVENTION

It is an objective of this invention to provide a network-based remotely-controlled power switch device, which allows a user without an Internet account to be nevertheless able to use a remote PC system for remote power control of an electricity-powered system.

It is another objective of this invention to provide a network-based remotely-controlled power switch device, which allows the user to perform scheduled ON/OFF control to an electricity-powered system.

In accordance with the foregoing and other objectives, a novel network-based remotely controlled power switch device is proposed.

The network-based remotely-controlled power switch device of the invention is designed for use with an electricity-powered system and a power source to allow a remote PC system to control the ON/OFF of the electricity-powered system via the Internet, the Ethernet, or the PSTN.

Broadly defined, the network-based remotely-controlled power switch device of the invention includes the following system components: (a) a main control unit; (b) an Ethernet interface, under control of the main control unit and externally connected to the Ethernet, for controlling the data communication between the Ethernet and the main control unit; (c) a modem interface, control of the main control unit and externally connected via a modem to the PSTN, for controlling the data communication between the modem and the main control unit; (d) a clock unit capable of generating a time signal representative of the current time; (e) a Web server capable of serving up a remote-control Web page which provides a set of user-settable ON/OFF control options for remote power control of the electricity-powered system; and (f) a switch unit having an input and connected to the power source and as output end connected to the electricity-powered system; the switch unit being under control of the main control unit to control the ON/OFF of the connection between the power source and the electricity-powered system.

When the remote PC system is successfully linked via the Ethernet interface or via the modem interface to the main control unit, the main control unit requests the Web server to serve up the remote-control Web page and then transfers the remote-control Web page back to the remote PC system, allowing the remote PC to accept a user-specified ON/OFF control option and than transfer the user specified ON/OFF control option back to the main control unit. In response to the user-specified ON/OFF control option, the main control unit accordingly issues an ON/OFF signal to the switch unit to cause the switch unit to control the ON/OFF of the electricity-powered system.

The invention allows a user without an Internet account to be nevertheless able to use a remote PC system for remote ON/OFF control of the electricity-powered system, and also allows the user to perform scheduled ON/OFF control to the electricity-powered system so that the electricity-powered system can be automatically powered ON or OFF at a specified time.

BRIEF DESCRIPTION OF DRAWINGS

The invention can be more fully understood by reading the following description of the preferred embodiments, with reference made to the accompanying drawings, wherein.

DETAILED DESCRIPTION OF PREFERRED EMBODIMENTS

Figure 1:
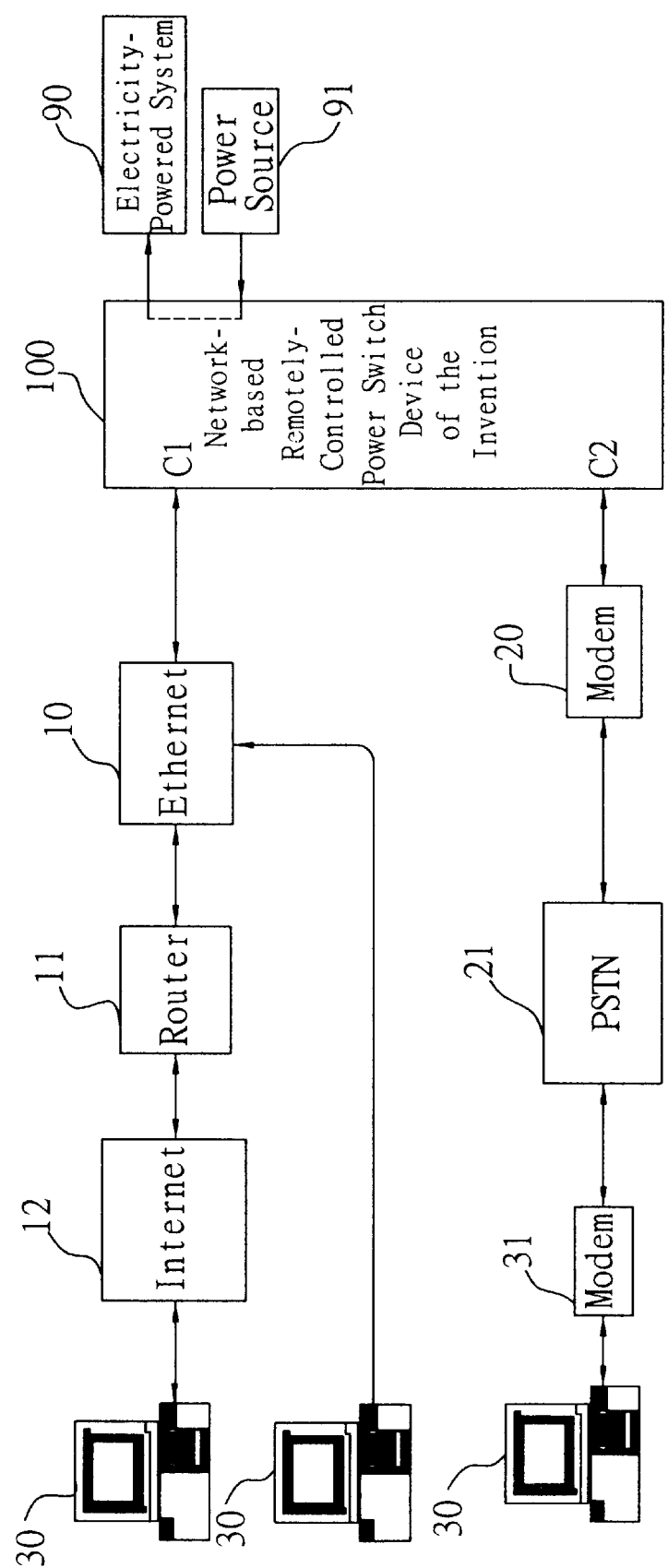
FIG. 1 is a schematic diagram used to depict the utilization of the network-based remotely-controlled power switch device of the invention.

FIG. 1 is a schematic diagram used to depict the utilization of the network-based remotely-controlled power switch device of the invention. In FIG. 1, the network-based remotely-controlled power switch device of the invention is the block designated by the reference numeral 100. As shown, the power switch device of main invention 100 is connectable between an electricity-powered system 90 and a power source 91 to control the power connection between the electricity-powered system 90 and the power source 91. The electricity-powered system 90 can be, for example, a PC, a TV, or a video recorder, to name just a few. In practice, the power switch device of the invention 100 includes a power outlet port which allows the power connector of the electricity-powered system 90 to be directly inserted therein without having to make any modifications to the electricity-powered system 90.

It is to be noted that the power switch device of the invention 100 can be used for remote ON/OFF control of a number of electricity-powered systems. To simplify the drawing and description, however, FIG. 1 only demonstratively shows one main powered system.

As shown in FIG. 1, the power switch device of the invention 100 further includes two connecting ports: a network port C1 and a modem port C2. The network port C1 is used for connection to a computer network system, such as Ethernet 10, which is further linked via a router 11 to the Internet 12. The modem port C2 is used for external connection to a modem 20 which is further linked to the PSTN (Public Switched Telephone Network) 21.

With the power switch device of the invention 100, the user can operate a remote PC system 30, or an equivalent, to control the ON/OFF of the electricity-powered system 90 via three routes: (1) via the Internet 12; (2) via the Ethernet 10; and (3) via the PSTN 21. The first method is adapted to be utilized by users with an Ethernet account; the second method is adapted to be utilized by users with an Ethernet account; and the third method can be utilized by users having no Internet and Ethernet accounts, or when the Internet or Ethernet is inaccessible. The user can choose between these methods to gain remote access to the power switch device of the invention 100.

If the user has an Internet account, he/she simply, needs to link the remote PC system 30 to the Internet 12, and the remote PC system 30 can be linked to the power switch device of the invention 100 via the router 11 and the Ethernet 10. If the user has as Ethernet account he/she can instead link the remote PC system 30 directly via the Ethernet 10 to the power switch device of the invention 100. If the Internet 12 or the Ethernet 10 is inaccessible, the user can nevertheless link the remote PC system 30 to the power switch device of the invention 100 via the PSTN 21 and the modem 20 (in this case, the remote PC system 30 should be installed with a modem 31.

When the remote PC system 30 is successfully linked to the power switch device of the invention 100, the power switch device of the invention 100 will promptly send a remote control program (which is implemented as a Web page in preferred embodiment) via the network link back to the remote PC system 30. This remote control program, when running on the remote PC system 30, allows the user to specify is power control option from the following options:

(1) Instant Power ON;
(2) Instant Power OFF;
(3) Scheduled Power-ON Time; and
(4) Scheduled Power-OFF Time.

In the case of Option (1), it will cause the power switch device of the invention 100 to immediately switch ON the electricity-powered system 90; in the case of Option (2), it will the power switch device of the invention 100 to immediately switch OFF the electricity-powered system 90; in the case of Option (3), it will cause the power switch device of the invention 100 to switch ON the electricity-powered system 90 at a later time specified by the Scheduled Power-ON Time; and in the case of Option (4), it will cause the power switch device of the invention 100 to switch OFF the electricity-powered system 98 at a later time specified by the Scheduled Power-OFF Time.

Figure 2:
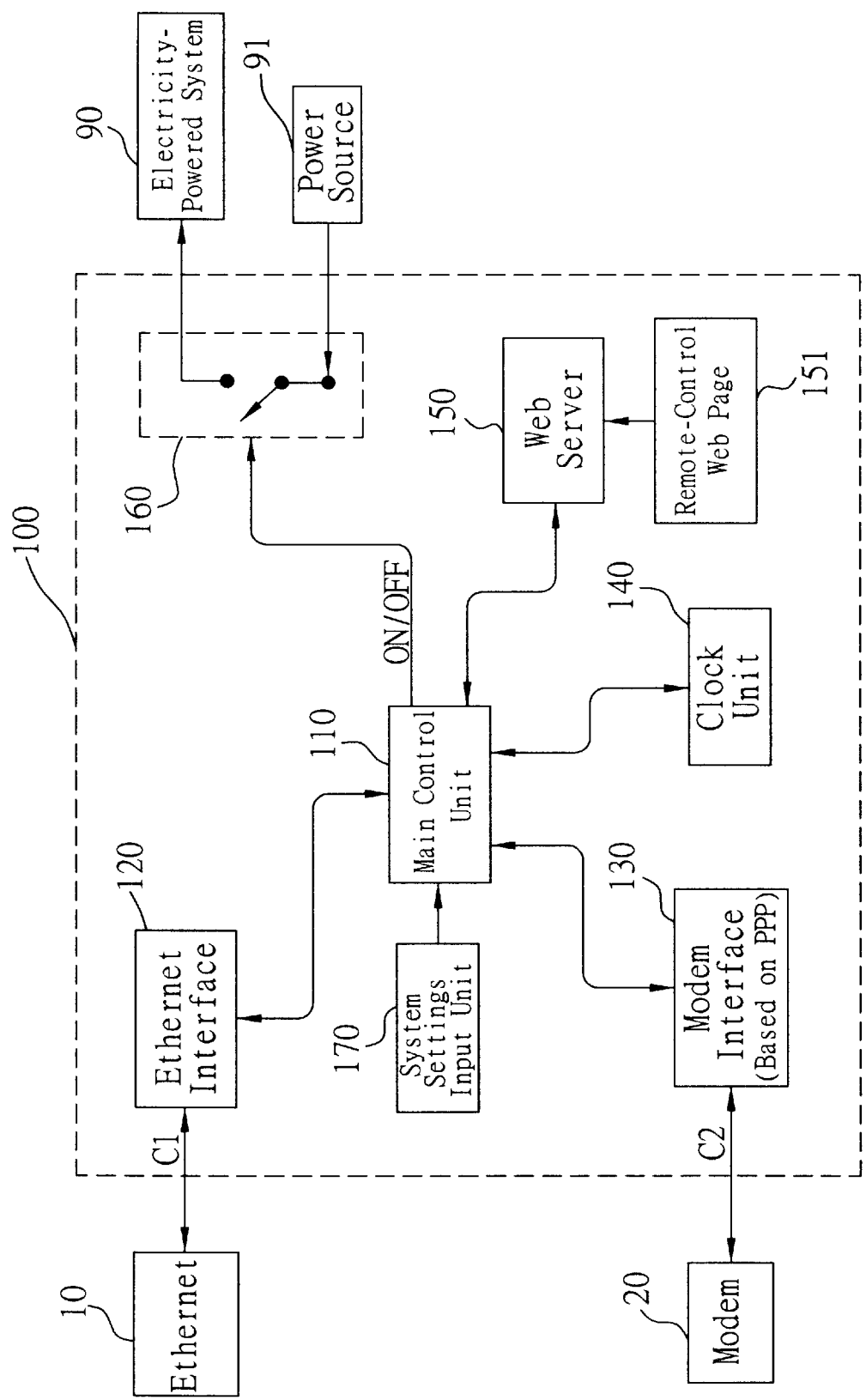
FIG. 2 is a schematic block diagram showing the inside architecture of the network-based remotely-controlled power switch device of the invention.

FIG. 2 is a schematic block diagram showing the inside architecture of the power switch device of the invention 100. As shown, the power switch device of the invention 100 includes a main control unit 110, an Ethernet interface 120, a modem interface 130, a clock unit 140, a Web server (also called HTTP server) 150 for a remote-control Web page 151, a switch unit 160, and a system settings input unit 170.

The main control unit 110 is used to control the operations of the Ethernet interface 120, the modem interface 130, the clock unit 140, the Web sever 150, and the unit 160. The Ethernet interface 120 is used to control the data communication between the Ethernet 10 and the main control unit 110; while the modem interface 130 is used to control the data communication between the modem 20 and the main control unit 110. In accordance with the invention, the modem interface 130 is based on the Point-to-Point Protocol (PPP), which allows an Internet-like communication link between the power switch device of the invention 100 and the remote PC system 30. The system settings input unit 170 allows the user to specify a required set of communication settings to the Ethernet interface 120 and the modem interface 130, includes for example, the Internet Protocol (IP) Address the subnet mask, and so on.

The clock unit 140 is capable of generating a time signal representative of the current time. The Web server 150 is used to serve up the remote-control Web page 151 when the link between the remote PC system 30 and the power switch) device of the invention 100 is established. The remote-control Web page 151, when running on the remote PC system 30, allows the user to specify a power control option from the above-mentioned four options.

The switch unit 160 can be a relay of an electronic type of switch, whose input end is connected to the power source 91 and whose output end is connected to the electricity-powered system 90. When the switch unit 160 is close-circuited, it allows the output power from the power source 91 to be transferred to the electricity-powered system 90; and when open-circuited, it cuts off the power connection between the power source 91 and the electricity-powered system 90.

As mentioned earlier, the user can link the remote PC 30 to the power switch device of the invention 100 via three routes: (1) via the Internet 12; (2) via the Ethernet 10; and (3) via the PSTN 21. The operation of each of these linking methods are respectively described in the following.

Linking via the Internet

Referring to FIG. 2 together with FIG. 1. In the case of linking via the Internet 12 to the power switch device of the invention 100, the user first needs to link the remote PC system 30 through dial-up to the Internet 12; and then, the user can operate a browser program, such as Internet Explorer or Netscape, to gain access to the IP address of the power switch device of the invention 100. As shown in FIG. 1, the data communication between the remote PC system 30 and the power switch device of the invention 100 is carried out via the Internet 12, the router 11, and the Ethernet 10. When the link is established, the main control unit 110 promptly requests the Web server 150 to send out the code and data of the remote-control Web page 151 is a serial format, such as UART, RT11, UTP, or BNC. The main control unit 110 then transfers these code and data via the Ethernet interface 120, the Ethernet 10, the router 11, and the Internet 12 to the remote PC system 30.

When the remote PC system 30 executes the code and data of the remote-control Web page 151, it allows the user to specify his/her desired power control option to the electricity-powered system 90. As mentioned earlier, the remote-control Web page 151 provides four power control options including (1) Instant Power ON; (2) Instant Power OFF; (3) Scheduled Power-ON Time; and (4) Scheduled Power-OFF Time. If Option (3) or (4) is selected, the user needs to specify a time point when the electricity-powered system 90 is scheduled to be power ON or OFF. The user-specified ON/OFF control option is then transferred via the Internet 12, the router 11, and the Ethernet 10 back to the power switch device of the invention 100.

If the user-specified ON/OFF control option is Option (1) or (2), the main control unit 110 will instantly issue an ON/OFF signal to the switch unit 160 to cause the switch unit 160 to be close-circuited in the case of Option (1), of open-circuited is the case of Option (2). If the user-specified ON/OFF control option is Option (3) or (4), the main control unit 110 will continuously monitor the output time signal from the clock unit 140 to check whether the Scheduled Power-ON Time or Scheduled Power-OFF Time is matched to the clock time. When matched, the main control unit 110 will promptly issue an ON/OFF signal to the switch unit 160 to cause the switch unit 160 to be close-circuited in the case of Option (3), or open-circuited in the case of Option (4). When the switch unit 160 is close-circuited, it establishes a power connection between the power source 91 and the electricity-powered system 90; and when open-circuited, the power connection is cut off.

Linking via the Ethernet

In the case of linking via the Ethernet 10 to the power switch device of the invention 100, the remote PC system 30 should be installed with an Ethernet card which allows the remote PC system 30 to be linked directly via the Ethernet 10 to the power switch device of the invention 100. In this also, the interaction between the remote PC system 30 and the power switch device of the invention 100 is substantially the same as the forgoing case of linking via the Ethernet 10 except that the data communication is carried out directly via the Ethernet 10 without via the router 11 and the Internet 12. Details of the interaction will therefore not be repeatedly described here.

Linking via the PSTN

In the case of linking via the PSTN 21 to the power switch device of the invention 100, the remote PC system 30 should be installed with a modem 31 and associated communication software that allows the remote PC system 30 to be linked to the power switch device of the invention 100 through dial-up to the PSTN 21. In this case, the remote PC system 30 communicates with the main control unit 110 via the modem interface 130 rather main the Ethernet interface 120. Since the modem interface 130 is based on PPP, it allows an Internet-like communication link between the remote PC system 30 and the power switch device of the invention 100. After the link is established, the interaction between the remote PC system 30 and the power switch device of the invention 100 is substantially the same as the forgoing cases of linking via the Internet 12 and the Ethernet 10 except that the data communication is here carried out via the modem interface 130 rather than via the Ethernet interface 120. Details of the interaction will therefore not be repeatedly described here.

What shown in FIG. 2 is the basic architecture of the power switch device of the invention 100. In practice, the main control unit 110 can be implemented as a CPU with a set of associated memory devices, such as flash memory, SRAM (Static Random-Access Memory), DRAM (Dynamic Random-Access Memory), and Series EEPROM (Electrically Erasable and Programmable Read-Only Memory). These memory devices are used to store all the control and communication programs executed by the CPU as well as the system settings specified by the system settings input unit 170. For instance, the remote-control Web page 151 is stored in the Serial EEPROM; while the user-specified Scheduled Power-ON Time and Scheduled Power-OFF Time are stored in the flash memory, so that these data can be nevertheless retained in the event of a power interrupt.

Conclusion

In conclusion the invention provides a novel network-based remotely-controlled power switch device which can be coupled to an electricity-powered system, such as a PC, a TV, or a video recorder, to allow the use of a remote computer system to control the ON/OFF of the electricity-powered system via a network system, such as the Internet, the Ethernet, or the PSTN. Compared to the prior art, the invention allows a user without an Internet account to be nevertheless able to use a remote PC system for remote ON/OFF control of the electricity-powered system, and also allows the Internet to perform scheduled ON/OFF control to the electricity-powered system so that the electricity-powered system can be automatically powered ON or OFF at a specified time. It is apparent that the invention is more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore should be accorded the broadest interpretation so as to encompass all such modifications and similar arrangements.

What is claimed is:

1. A network-based remotely-controlled power switch device for use with an electricity-powered system and a power source to allow a remote PC system to control the ON/OFF of the electricity-powered system via the Internet, the Ethernet, or the PSTN;

the network-based remotely-controlled power switch device comprising:
 (a) a main control unit;
 (b) an Ethernet interface, under control of the main control unit and externally connected to the Ethernet, for controlling the data communication between the Ethernet and the main control unit;
 (c) a modem interface, under control of the main control unit and externally connected via a modem to the PSTN, for controlling the data communication between the modem and the main control unit;
 (d) a clock unit capable of generating a time signal representative of the current time;
 (e) a Web server capable of serving up a remote-control Web page which provides a set of user-settable ON/OFF control options for remote power control of the electricity-powered system; and
 (f) a switch unit having an input end connected to the power source and an output end connected to the electricity-powered system; the switch unit being under control of the main control unit to control the ON/OFF of the connection between the power source and the electricity-powered system;

wherein when the remote PC system is successfully linked via the Ethernet interface or via the modem interface to the main control unit, the main control unit requests the Web server to serve up the remote-control Web page and then transfers the remote-control Web page back to the remote PC system, allowing the remote PC system to accept a user-specified ON/OFF control option and then transfer the user-specified ON/OFF control option back to the main control unit; and in response to the user specified ON/OFF control option, the main control unit issues an ON/OFF signal to the switch unit to cause the switch unit to control the ON/OFF of the electricity-powered system.

2. The power switch device of claim 1, wherein the set of user-settable ON/OFF control options includes: (1) Instant Power ON; (2) Instant Power OFF: (3) Scheduled Power-ON Time; and (4) Scheduled Power-OFF Time.

3. The power switch device of claim 1, wherein the modem interface is based on the Point-to-Point Protocol for data communication between the modem and the main control unit.

4. The power switch device of claim 1, wherein the remote-control Web page is stored in a Serial electrically erasable and programmable read-only memory EEPROM device.

5. The power switch device of claim 2, wherein the data of user-specified Scheduled Power-ON Time and Scheduled Power-OFF Time are stored in an flash memory unit.

* * * * *